US008378296B1

(12) United States Patent
Enke

(10) Patent No.: US 8,378,296 B1

(45) Date of Patent: Feb. 19, 2013

(54) ENHANCEMENT OF CONCENTRATION RANGE OF CHROMATOGRAPHICALLY DETECTABLE COMPONENTS WITH ARRAY DETECTOR MASS SPECTROMETRY

(75) Inventor: Christie Enke, Placitas, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 13/080,392

(22) Filed: Apr. 5, 2011

Related U.S. Application Data

(60) Provisional application No. 61/320,989, filed on Apr. 5, 2010.

(51) Int. Cl.
*B01D 59/44* (2006.01)
*H01J 49/00* (2006.01)

(52) U.S. Cl. ........ 250/288; 250/281; 250/282; 250/284; 250/286

(58) Field of Classification Search .................. 250/281, 250/282, 284, 286, 288
See application file for complete search history.

(56) References Cited

U.S. PATENT DOCUMENTS

| | | | | |
|---|---|---|---|---|
| 3,946,229 | A * | 3/1976 | Moseman et al. | 250/292 |
| 4,758,085 | A * | 7/1988 | Lequime et al. | 356/319 |
| 7,429,728 | B2 * | 9/2008 | Enke | 250/282 |
| 7,435,578 | B2 * | 10/2008 | Wikswo et al. | 435/288.3 |
| 7,704,745 | B2 * | 4/2010 | Baudenbacher et al. | 436/34 |
| 7,713,733 | B2 * | 5/2010 | Cliffel et al. | 435/305.1 |
| 7,947,950 | B2 * | 5/2011 | Enke et al. | 250/290 |
| 7,981,649 | B2 * | 7/2011 | Wikswo et al. | 435/173.5 |
| 2005/0014129 | A1 * | 1/2005 | Cliffel et al. | 435/4 |
| 2005/0153273 | A1 * | 7/2005 | Wikswo et al. | 435/4 |
| 2008/0017792 | A1 * | 1/2008 | Enke et al. | 250/287 |
| 2009/0305319 | A1 * | 12/2009 | Baudenbacher et al. | 435/29 |

* cited by examiner

*Primary Examiner* — David A Vanore

(74) *Attorney, Agent, or Firm* — Gonzales Patent Services; Ellen M. Gonzales

(57) ABSTRACT

Methods and instruments for high dynamic range analysis of sample components are described. A sample is subjected to time-dependent separation, ionized, and the ions dispersed with a constant integration time across an array of detectors according to the ions m/z values. Each of the detectors in the array has a dynamically adjustable gain or a logarithmic response function, producing an instrument capable of detecting a ratio of responses or 4 or more orders of magnitude.

16 Claims, 4 Drawing Sheets

ENHANCEMENT OF CONCENTRATION RANGE OF CHROMATOGRAPHICALLY DETECTABLE COMPONENTS WITH ARRAY DETECTOR MASS SPECTROMETRY

CROSS-REFERENCE TO RELATED APPLICATIONS

The following application claims benefit of U.S. Provisional Application No. 61/320,989, filed Apr. 5, 2010, which is hereby incorporated by reference in its entirety.

STATEMENT REGARDING GOVERNMENT SPONSORED RESEARCH

This invention was made with Government support under Grant No. DE-ACO5-76RL01830, awarded by the Department of Energy—Battelle. The U.S. Government has certain rights in this invention.

BACKGROUND

The combination of chromatographic separation and mass spectrometric detection holds a central position in the analysis of complex biological mixtures. Survey analyses in which all components having the analytically detectable characteristics are sought are becoming increasingly common. They are of value in proteomics, metabolomics, and pharmaceutical studies, to name a few. However, the range of component concentrations that can be distinguished in a single chromatographic run depends on the number of components in the sample detectable by the means employed, the peak capacity of the chromatogram, and the dynamic range and discriminating power of the detector. The enhancement of peak capacity is one of the primary research goals in chromatography. In the case of complex natural samples such as breath, blood serum, or urine, the number of components of interest exceeds currently achievable peak capacities by many orders of magnitude. Researchers estimate that all components with a response less than ~1% of the most abundant component will not be observed. These unresolved components produce minor detector responses widely spread throughout the chromatogram to produce a background signal often referred to as "chemical noise." Peak capacity can be increased through the use of multichannel detection such as the separate mass-to-charge (m/z) values in mass spectrometry. With multiple channels of detection, components that co-elute can be separately detected, thus increasing peak capacity. The addition of this increased discrimination can reduce the number of unresolved components thereby extending the concentration range of detectable components by another order of magnitude or so. However, to detect minor components co-eluting with major components, it is necessary to have a wide dynamic range for each channel of detection. Most mass spectrometers multiplex the m/z channels using the same detector at different times. This makes the dynamic adjustment of gain on each channel difficult to achieve. Furthermore, being able to detect only the components above say 0.1% of the most abundant component is a debilitating limitation for many areas of biomedical research. The reason for this limitation is fundamental and therefore requires a breakthrough in technology to solve.

In 1983, Joe Davis and Cal Giddings quantified the degree of peak overlap that would occur during chromatographic separation of a complex mixture, assuming a random retention time for each component. The Poisson statistics they employed had earlier been reliably used to predict peak overlap in photon and ion counting and in the detection of nuclear events. The results of the Giddings study were quite remarkable: in a chromatogram of 50 components in which there would be room for 100 distinguishable peaks (peak capacity of 100), only 18 of the components would not suffer overlap from others. Doublets (7), triplets (3) and even a quadruplet were predicted. They further stated that, "... a chromatogram must be approximately 95% vacant in order to provide a 90% probability that a given component of interest will appear as an isolated peak." This early paper has received 170 citations since its publication. Davis and others have gone on to demonstrate its validity and to refine and extend the theory of peak overlap (Davis 1997; Davis 1999).

A major difference between the response of components in a chromatogram and the response of ion, photon, or gamma ray detectors is that the components in a natural sample have a range of responses as a result of differences in component sensitivity and concentration (F. Dondi 1997). Thus, in later analyses, workers have come to refer to "detectable peaks" rather than "number of components". Statistical analysis (Davis 1994; Davis 1997; Dondi, Bassi et al. 1998) and Fourier transform analysis (Felinger, Pasti et al. 1990; Felinger, Pasti et al. 1991; Felinger, Vigh et al. 1999) have been used to predict the number of detectable peaks in complex chromatograms. In one recent comparison of these approaches, (Fellinger and Pietrogrande 2001), a chromatogram of diesel fuel showed 180 clearly identifiable peaks. Since the chromatogram is essentially filled with peaks, the peak capacity must be on the order of 200. Statistical and Fourier transform analysis project that the number of detectable peaks in the sample is 244 and 242, respectively. This is only a tiny fraction of the actual number of components in the sample.

Attempts to deconvolute overlapped peaks of single-detector chromatograms into their separate components by mathematical means cannot get beyond the modest improvement indicated by this diesel fuel example. Acknowledgement of this fact has led chromatographers to devise methods to increase chromatographic peak capacity. The method providing the greatest improvement is 2-d chromatography, in which fractions from the first chromatogram are then chromatographed again with a different type of stationary phase. Depending on how different the selectivity criteria are between the stationary phases, the resulting effective peak capacity can be as much as the product of the individual peak capacities. The majority of authors citing the Davis/Giddings paper do so to justify the need for 2-d chromatography. This approach is most often used with only selected sections of the first chromatogram, because a full 2-d chromatogram can take many hours or even days to perform. Alternatively, investigators gain concentration range through a variety of prior sample separation steps (extraction, absorption, etc.) to remove the most abundant components (e.g, albumin, ubiquitin, and other abundant proteins in biological samples). Problems with this latter approach include loss of time, increased required expertise of the operator, and the potential for losing some of the minor components that get trapped with the major components. The foreseeable methods to improve single chromatogram resolution are modest compared to the orders of magnitude needed.

In general, there are two classes of deconvolution methods applied to chromatographic data. One is simply the attempt to resolve peak shoulders and broadening into the separate peaks that make up the resulting response shapes (Felinger 1998). It follows that the resolved components must have responses of roughly the same order of magnitude or there would be no discernible effect on the majority peak shape. In fact, the maximum number of resolved components afforded by such techniques is given by the statistical and Fourier transform analyses referred to above, or roughly 133% of the apparent peak count. To get beyond this modest increase in resolution, one clearly needs additional data. Such additional data can be provided by multiple parallel detection channels having different selectivity. This, in effect, divides the chromatographic response pattern among the several detectors. The greatest gain in this respect is achieved by the largest number of detectors, each monitoring a unique property of the sample components. In this area, the collection of an optical or mass spectrum at successive small increments of chromatographic time affords the greatest amount of useful additional data.

Thirty years ago Biller and Biemann (Biller and Biemann 1974) recognized that the hundreds (or thousands) of independent detection channels of mass spectrometry can help deconvolute overlapping chromatographic peaks and separately characterize each component. When spectra covering a range of masses are collected at a rate that provides at least several spectra per chromatographic peak width, the response at each mass can be plotted as a function of chromatographic time. Such plots are called mass or ion chromatograms. Each plot is effectively that of a mass-selective detector for the chromatogram. Since the number of used channels could reasonably be in the hundreds (or even thousands for high-resolution mass spectra), the chromatographic peak capacity is multiplied by roughly this number. This is a huge gain in peak capacity, especially considering that it requires no additional analysis time to achieve. Despite using a scanning sector mass spectrometer and a crude data system, Biller and Biemann demonstrated an increase in the concentration range of observable components that could be detected. However, as chromatography advanced through narrower peaks and decreased sample size, the ability of mass spectrometers to provide the data required fell behind. Scanning instruments lose sensitivity in proportion to the requisite mass range and scanning rate and their mass chromatograms are not perfectly synchronized.

The importance of a greater concentration range is that it has a huge effect on the number of components in a complex mixture that can be determined. Nagels, et. al. (Nagels, Creten et al. 1983) counted peak frequency vs. peak area in chromatograms of a large number of plant extracts. FIG. 1 is a plot of their data. They demonstrated that the relative response for components of a complex mixture is an approximately exponential function. However, even though they pointed out that an exponential function did not provide a good fit, they are widely cited as evidence that the concentration distribution function is in fact exponential (El Fallah and Martin 1987; Felinger 1998).

However, as explained in further detail below, new mathematical models for determining the total number of components in a complex sample based on the number of detectable components in the sample indicate that a dynamic response in the order of 5 orders of magnitude will be required to detect the top 99% of component responses. This dynamic response must be achieved with short and uniform detector integration times. Such a capability is not available with any of the current mass spectrometer detector systems.

The use of multiple mass chromatograms for the resolution of overlapping chromatographic peaks has evolved into two areas of application. Scanning mass analyzers such as the quadrupole are used in scanning or multiple-ion mode at normal chromatographic speeds. A variety of mathematical approaches to unskew the spectra and determine overlapping compounds has been developed (Sato and Mitsui 1994; Abbassi, Mestdagh et al. 1995; Windig and Smith 2007). For GC/MS, methods of data treatment to extract the mass spectra of overlapped components have been developed by several researchers (Biller and Biemann 1974; Abbassi, Mestdagh et al. 1995; Windig, Phalp et al. 1996; Fraga 2003; Windig and Smith 2007). The losses incurred in scanning result in noisy ion chromatograms for the minor components, although components with peak heights as low as 1/60 of the largest peaks have been detected (Fraga 2003). These methods have been applied to biological studies with LC separation and electrospray ionization in TOFMS systems with high mass resolution at ~3 spectra per second (Aberg, Torgrip et al. 2008) and in quadruple scanning instruments at 0.1 amu resolution and 1 spectrum per second (Govorukhina, Reijmers et al. 2006). All of the cited examples show results for components having maximum response ratios of only 100:1 at best.

The other area of application of deconvolution aims to reduce the time of gas chromatographic analysis by using short columns, high flow rates and the rapid spectral generation rates afforded by TOFMS analyzers (Holland, McLane et al. 1992; van Deursen, Beens et al. 2000). Component detection with a response range of two orders of magnitude has been demonstrated (Veriotti and Sacks 2001). An analytical instrument based on the use of spectral deconvolution to compensate for the increased component overlap has been commercialized (LECO Corporation). A deconvolution method involving isotope ratios has been used in the analysis of mixtures of polychlorinated compounds by GC/TOFMS (Imasaka, Nakamura et al. 2009). Again, even in these successful approaches, the ratio of peak heights of identified compounds is less than 100:1.

Four commonly used methods of data treatment were recently compared for their effectiveness in reducing the problems of background noise (Fredriksson, Petersson et al. 2007). It is the nature of this noise that is of particular interest. Aberg et al. (Aberg, Torgrip et al. 2008) say, "Much of the chemical noise in the data originates from substances in the analyzed sample that are present at too low concentrations to give stable detectable signals in consecutive scans. . . . Such signals will not be tracked [detected] because they have (i) unpredictable m/z values due to bad ion statistics and (ii) too many scans with missing data, and thus the Kalman filter discards these signals as noise." The data in all these papers and the emphasis on noise reduction clearly indicate that there is too little ion flux information to obtain reliable signals for those components with responses less than 1% of the most abundant compounds. Batch mass analysis instruments are limited in the ion flux they can tolerate in the mass analyzer (Ion trap, Orbitrap© and FT MS) and the ion detector and limited ion throughput in TOFMS limit the concentration ratio of the most abundant to least detectable component. Therefore, an increase in ion detection rate is key to increasing the useful concentration range of component detection.

SUMMARY

The present disclosure provides the enhancement of the concentration range of chromatographically detectable components with array detector mass spectrometry. In an embodiment of the presently described invention, a physical array of detectors is used for the various m/z channels, each element of the array having an automatic gain control to provide the desired dynamic range. This array detector can be used with a magnetic sector m/z dispersion device or with a distance-of-flight mass spectrometer or any other suitable device in which ions of different m/z values are physically dispersed. Each 10-fold decrease in detection level results in a roughly 10-fold increase in the peak capacity, giving this approach a major advantage over mass spectrometric detectors that use a single, or even several parallel, ion detectors.

DETAILED DESCRIPTION

The present disclosure provides techniques and instrumentation that enable thorough analysis of complex samples including analysis of components that were previously undetectable due to their relatively minute concentration within the sample in comparison to other components. It will be understood that analytical instruments such as mass spectrometers do not directly measure the concentration of any given component within a sample, but rather detect responses and then use a calibration method to calculate concentration based on the detected response. Accordingly, as the concentration ratio of various components within the sample increases the dynamic range over which an instrument is able to detect various responses must also increase. It logically follows that as it becomes more and more desirable to analyze components having smaller and smaller concentrations within the sample, to the point of analyzing very nearly all (i.e., greater than 99%, greater than 99.9% or even more) of the detectable components in the sample, the concentration ratio naturally increases and the dynamic range of the instrumentation's response detection must also increase. As described in the background section, limitations in resolution, dynamic range of detection, and ion throughput have prevented the detection of components of complex mixtures in survey analyses which were more than 3 orders of magnitude lower in response than the major components. Those below this detection limit appear as background noise (sometimes called "chemical noise") in the analysis. Lacking a method to assess the number and response levels of these undetected components, the dynamic range required to detect them could not be determined. However, recently, Enke and Nagels have demonstrated that the analytical response distribution for several natural mixtures is in fact log-normal, not exponential as previously thought. (See e.g., Enke and Nagels "Undetected Components in Natural Mixtures: How Many? What Concentrations? Do They Account for Chemical Noise? What is Needed to Detect Them?" Anal. Chem. 2011, 83, 2539-2546, see also U.S. Provisional Patent Application Ser. No. 61/471,862, filed Apr. 4, 2011, both of which are hereby incorporated by reference.) This is an important finding as it now allows one to predict from the components observed for a given complex mixture a finite number for how many potentially detectable components there are in the sample and what range of responses they will have.

Figure 1:
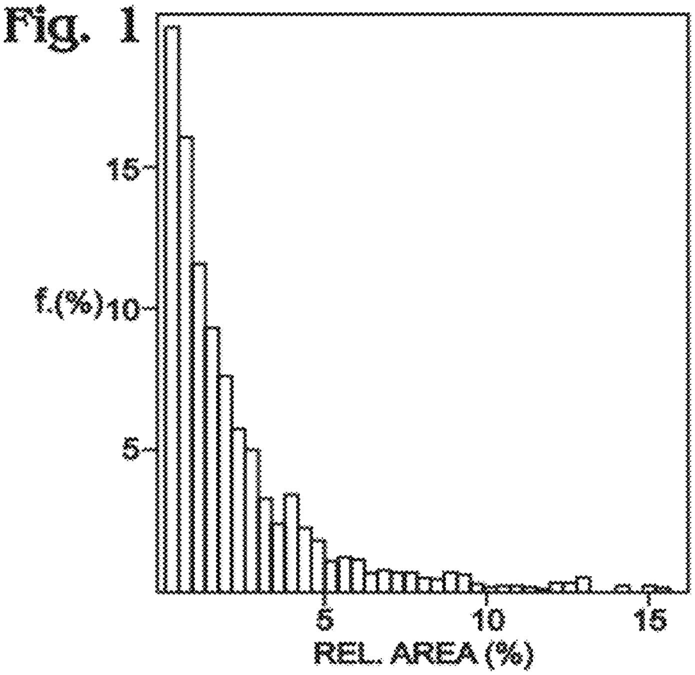
FIG. 1 is a plot of chromatographic peak area vs. peak frequency for complex mixtures. The straight line is the exponential function shown.
Figure 2:
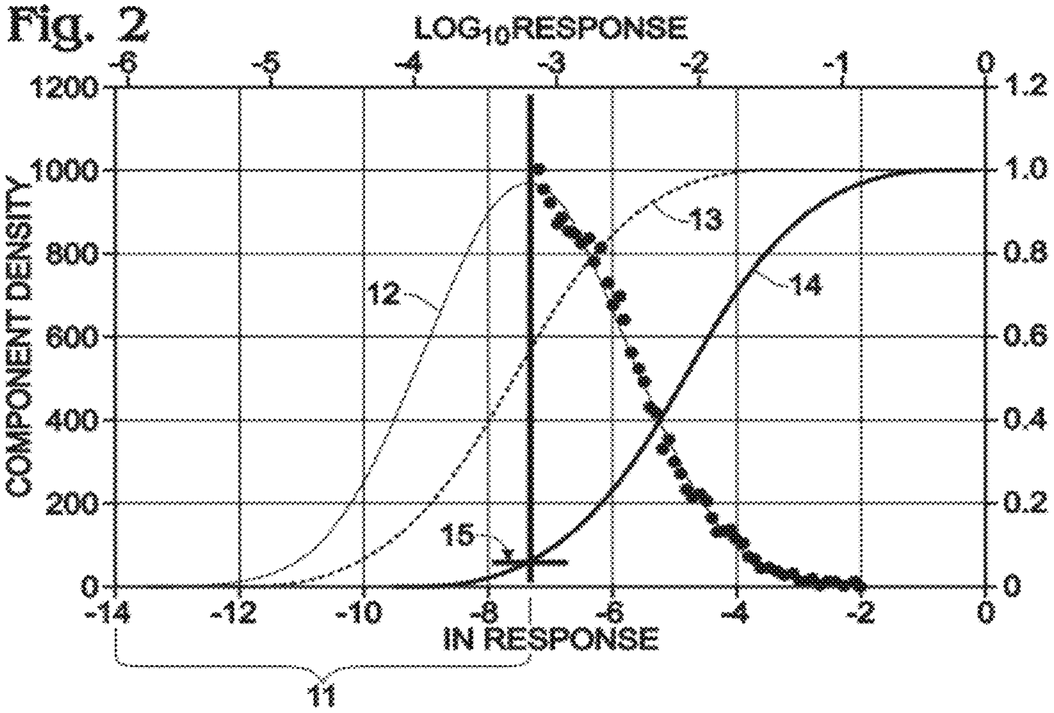
FIG. 2 is a graph showing the fit of data from a light crude oil sample to the log-normal function.

FIG. 2 is a graph showing the fit of data from a light crude oil sample to the log-normal function. In the graph, region 11 indicates the region below the detection limit, curve 12 is the log-normal response function, curve 13 is the cumulative component count, and curve 14 is the cumulative component response. The fraction of total response due to chemical noise is shown at 15. As can be seen, the fit of the observed data (the dots on the curve) to the log-normal curve 12 is excellent, verifying the log-normal distribution over the range of component responses detected. Assuming the log-normal distribution applies to the undetected components, ~50% of the detectable components were detected. Since ~18,000 components were detected, there are about 36,000 detectable components in the sample. Further, the curve shows that ~5% of the response falls below the detection limit. The undetected components below this response level comprise 5% of the total signal. The group producing these data indicate that their background signal level was ~5%. This is further vindication of the applicability of the log-normal model to the response distribution of this sample. From the application of this model, the dynamic range for the expected responses can be determined. It goes from natural log −2 on the high end past natural log −12 on the low end. This is equal to 4.34 orders of magnitude. Other complex mixtures are seen to have somewhat differing dynamic ranges and numbers of components. Thus, it can be seen that a dynamic response on the order of 5 orders magnitude is required to detect the top 99% of component responses in a complex sample. Accordingly it is clear that previously described instruments, which were limited to a dynamic range of at most 2-3 orders of magnitude when operating with a constant integration time are incapable of detecting a significant number of sample components due to their low relative concentration and corresponding response.

Accordingly, the present disclosure provides the enhancement of the concentration range of chromatographically detectable components with array detector mass spectrometry. In an embodiment of the presently described invention, a physical array of detectors is used for the various m/z channels, each element of the array having an automatic gain control to provide the desired dynamic range. This array detector can be used with a magnetic sector m/z dispersion device or with a distance-of-flight mass spectrometer or any other suitable device in which ions of different m/z values are physically dispersed. Specifically, various embodiments of this approach are able to provide a dynamic response of greater than 3 orders of magnitude, as required by complex samples. According to various embodiments, the instruments and methodologies described herein are able to produce a dynamic response of greater than 4 orders of magnitude, greater than 5 orders of magnitude or even greater than 6 orders of magnitude. In general, the dynamic response is limited by ion throughput since generating a measurable signal at the low range means increasing the measurable signal at the high range. Dynamic response may also be limited by the range over which the detectors are able to autorange. Accordingly, the methods described herein could be applied to a sample containing any upper limit of dynamic response range so long as the instrumentation is able to handle the corresponding ion throughput and has the appropriate autoranging capabilities.

According to an embodiment, the invention involves the combination of a chromatograph, liquid, gas, supercritical fluid or other, or another method of time-dependent separation such as capillary electrophoresis or ion-mobility spectrometry, combined with a mass analyzer suitable for dispersing the m/z spectrum across an array of ion detectors, and an array of ion detectors where each detector has a dynamically adjustable gain or a logarithmic response function. In a further embodiment, the data collected from each element of the array as a function of chromatographic time is analyzed by computer algorithms to produce chromatographic peak profiles for each detector element and to convert these profiles into indications of component detection with at least a rough idea of the relative response created by each of the identified components.

The combination of chromatography and mass spectrometry has developed to the point that virtually all forms of chromatography have been interfaced to a mass spectrometer inlet and suitable methods for component ionization and transfer of the resulting component ions into the mass analyzer have been developed. Accordingly, the methods and devices of the present disclosure can be used with just about any type of chromatography. Those of skill in the art will also appreciate that the methods and devices described herein will also apply to ion streams that are produced by a previous mass analyzer and ion fragmentation or other ion reaction step such as in tandem mass spectrometry.

According to various embodiments, the mass analyzer to be used must be capable of sending the ions of various m/z values along physically disparate paths so they can be directed to an array of detectors, each of which detects only a portion of the m/z spectrum. Examples of currently developed mass analyzers that meet this criterion are the magnetic sector mass analyzer, specifically the type having the Mattauch-Herzog geometry, and the newly developing distance-of-flight mass analyzer.

Figure 3:
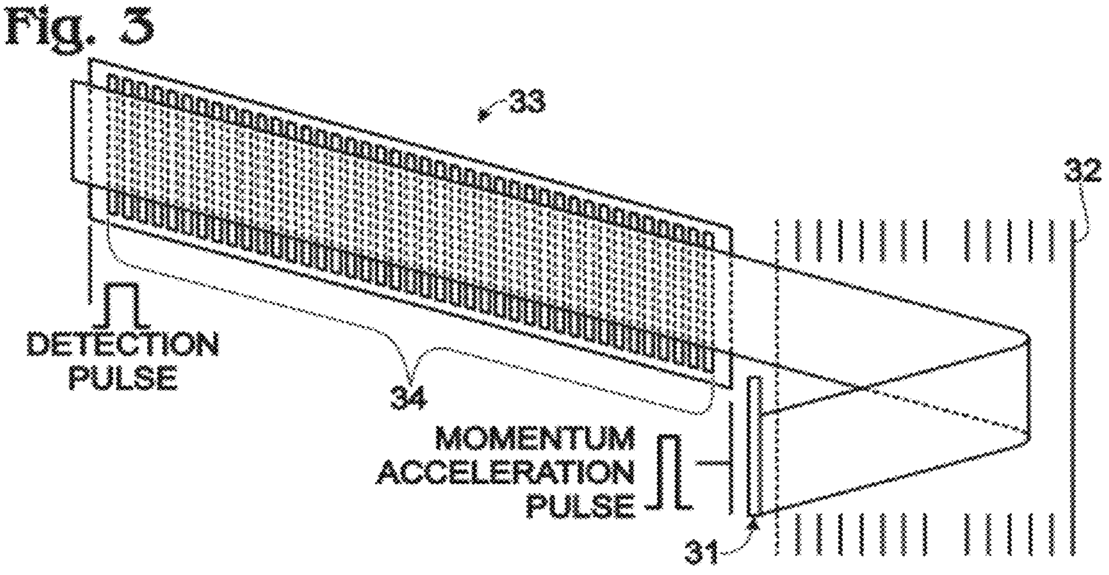
FIG. 3 depicts an exemplary distance-of-flight mass spectrometer (DOFMS). Ions pulsed from the sample ion beam exit the ion minor and are dispersed according to their m/z along the flight path. At a specific time, all the ions are driven to the array of detectors parallel to their flight path. The m/z assignment of each ion is determined by the detector upon which it lands.
Figure 4:
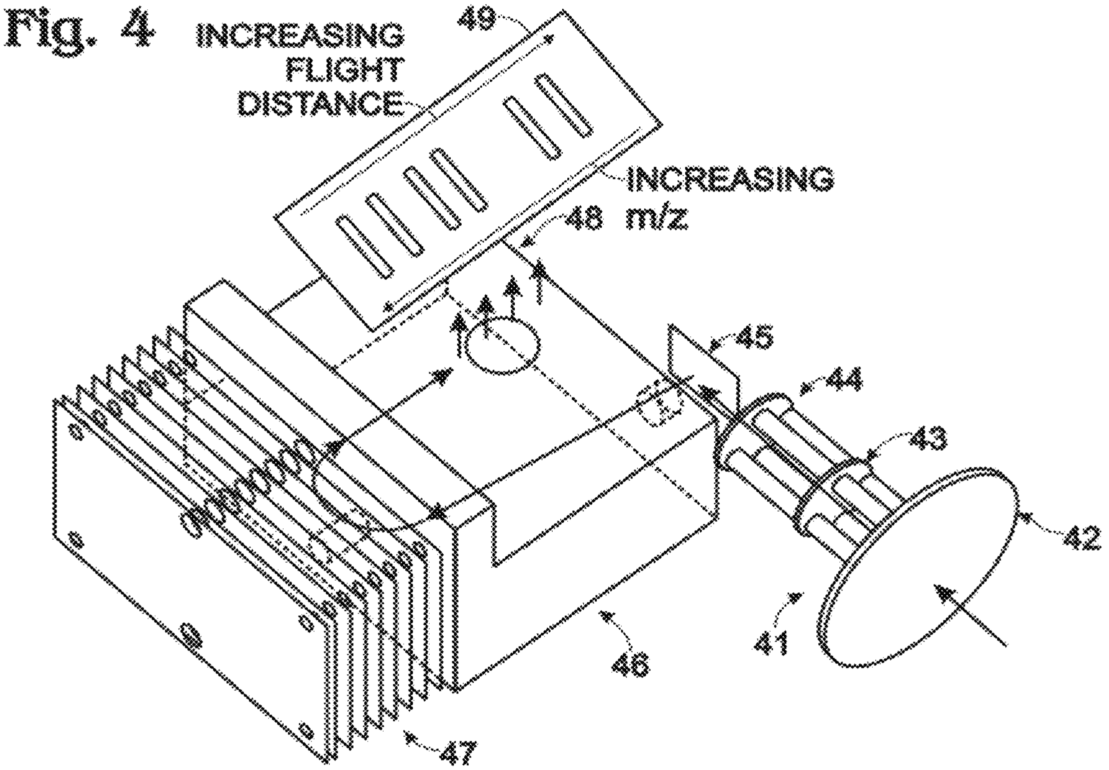
FIG. 4 is a schematic of a DOFMS. The ion path is shown with the arrows. The inset illustrates a DOFMS mass spectrum.

Distance of flight (DOF) is a new form of mass separation that employs an array of detectors, one for each increment of mass resolution, rather than a single detector. Distance of Flight mass spectrometry is described, for example, in U.S. Pat. Nos. 7,041,968 and 7,429,729, each of which are hereby incorporated by reference. Each of the detectors in the array can be an integrating device whose response range can be adjusted in real time so the effective dynamic range over the whole mass spectrum is greatly improved. Exemplary DOF mass spectrometers are shown in FIGS. 3 and 4. Turning first to FIG. 3, as with time-of-flight mass spectrometry (TOFMS), ions in a pulsed or continuous beam 31 are accelerated into an ion mirror 32 from which they exit into the detection field-free region 33. However, rather than detecting the arrival time of ions at the end of the flight path as in TOFMS, ions are distributed according to their m/z along the flight path and are then driven to a detector array 34 adjacent to the flight path. At the detection time, the ions with the least mass-to-charge ratio reach the farthest detector. The m/z range and resolution are determined by the length of the array and the spacing of elements along the array. The resulting mass spectrum is simply the plot of detector response vs. detector position.

In DOFMS, ion throughput is distributed among many integrating detectors, which results in a virtually unlimited detection rate. Since the major and minor components would not generally fall on the same set of detector elements, they will be detected without mutual interference and so provide an increased range of detectable concentrations.

A prototype DOFMS instrument, designed for isotope ratio applications of the actinide elements, has provided the first experimental demonstration of DOFMS principles. A diagram of the isotope-ratio DOFMS instrument 40 is shown in FIG. 4, where the path of the ions through the instrument is shown by the arrows. A glow discharge ion source (not shown) is sampled through a 3-stage differentially pumped interface 41 into an ion-optic train. This optic stack contains a 3$^{rd}$ stage vacuum orifice 42 which directs the ions to a DC quadrupole doublet lens 43, which is used to transform the incoming, circular cross-section ion beam into a beam having the shape of a slit (Myers, Li et al. 1995). The slit shape, which is further constrained by a slit optic 44, restricts the initial spatial distribution of ions and is an important aspect of achieving high resolving power in the DOFMS. Ions exiting the slit enter an extraction region 45 positioned between a repeller electrode and a grid electrode (not shown). Here, ions are extracted with constant-momentum acceleration along a trajectory perpendicular to their original motion. Constant-momentum acceleration (CMA) differs from the constant-energy acceleration (CEA) employed in most TOFMS in that the duration of the extraction voltage pulse is limited to ensure that ions are not able to exit the extraction region before the pulse ends (Wolff and Stephens 1953). Thus, ions gain an m/z-dependent energy that reflects the distance each was able to travel during lifetime of the constant-momentum pulse. The CMA pulsing technique imparts the same momentum to all m/z values, and therefore a velocity that varies linearly with m/z.

Once extracted, ions move through a field-free region 46 and into an ion reflectron or minor 47. In DOFMS, the ion minor focuses ions having different initial energies and positions in a way that is complementary to that in TOFMS. After exiting the ion reflectron, the ion beam moves into the DOFMS extraction region 48. This second extraction region consists of a plate and grid oriented to apply a linear electrostatic field perpendicular to the direction of the ions' travel (i.e., along the z-axis in FIG. 4). At a specified time delay relative to the constant-momentum pulse, a high-voltage pulse is applied to the DOFMS repeller electrode, deflecting the ion beam onto the surface of a position-sensitive detector 49. An important feature of the DOFMS technique is that ions of all m/z values achieve focus at the same instant (but at different spatial locations). Thus, a single extraction pulse is able to simultaneously deflect ions of all m/z values onto the detector surface. It is also noteworthy that the DOFMS extraction region is designed to take advantage of space-focusing principles, collapsing the width of the ion packet along the z-direction in FIG. 4. In experiments performed thus far, a phosphor screen-microchannel plate (PS-MCP) detector has been employed to visualize the spatial distribution of the ions (i.e. the mass spectrum). The image is then captured with a conventional camera. However, alternate versions may include other detector mechanisms include, for example, the focal plane camera described in greater detail below.

Figure 5:
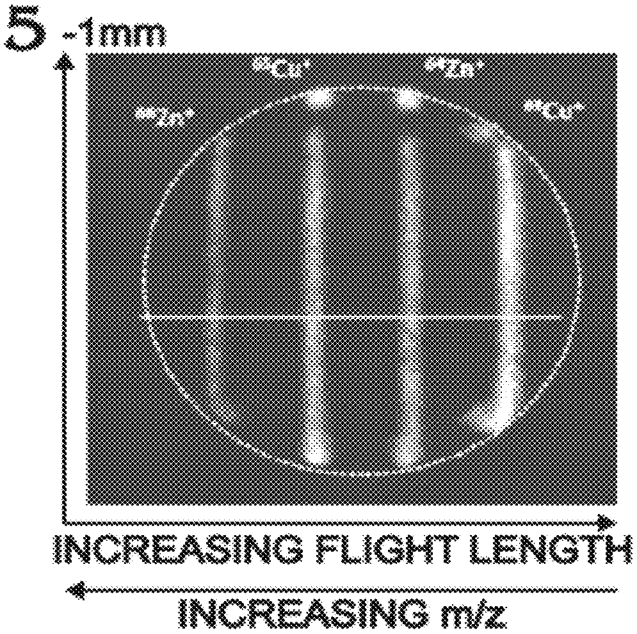
FIG. 5 shows the DOFMS mass spectrum obtained with a phosphor-based detector. The white dashed line shows phosphor screen dimensions; the solid line depicts the location of the line plot shown in FIG. 6.

An example of a DOFMS spectrum obtained with the instrument of FIG. 4 is shown in FIG. 5. Here, a sample containing both copper and zinc was used to produce atomic ions for trace analysis. A 165V/cm extraction field 1 μsec in duration imparts the same momentum to ions of all m/z. The ions separate over a flight distance of 30 cm, and a 787V/cm DOFMS extraction field applied 23.2 μsec after the CMA pulse deflects the copper and zinc ions onto the surface of the PS-MCP detector. Ions of each m/z value are observed as a slit image (much as in a mass spectrograph), with the intensity of phosphor emission being proportional to ion abundance. Each “slit” image is actually a z-axis profile of the initial ion beam at that point in its y-axis travel, somewhat broadened by the z axis deflection process. The quadrupole doublet provides some focusing of this beam so as to reduce the initial spatial dispersion. In DOFMS, the flight distance is proportional to the reciprocal of the ion mass (1/(m/z)), with the ions having the largest m/z traveling the shortest flight distance.

Figure 6:
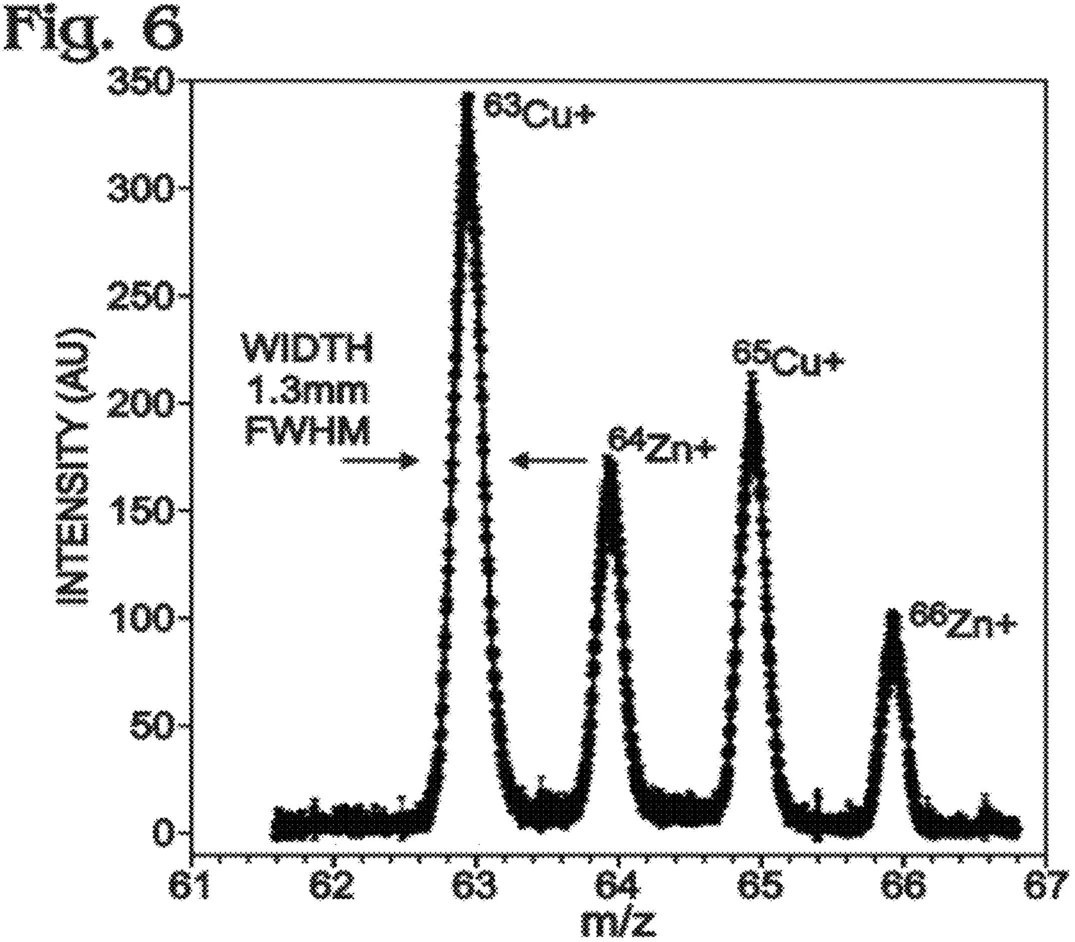
FIG. 6 Shows the DOFMS line plot mass spectrum.

The relative intensity distribution of the copper and zinc isotopes displayed as a line plot in FIG. 6 closely matches the expected natural distribution. In this example, the peak widths are approximately 1.0 mm to 1.5 mm wide measured at full-width half maximum (FWHM), reflecting a mass resolving power of approximately 350. Since the DOFMS constructed here is intended for atomic analyses, this level of resolution is sufficient.

Much as in TOFMS, the DOFMS operates at high repetition frequencies, limited by the mass range of interest. The image in FIG. 6 was obtained at a repetition rate of 10 kHz, and thus represents a superposition of tens of thousands of discrete mass spectra. Since ions of all m/z are extracted simultaneously from the extraction region, multiplicative noise sources can be overcome by simple ratioing, and techniques such as isotope dilution analysis are particularly effective. Further, like TOFMS, the DOFMS does not suffer from spectral skew error. Spectral skew refers to an artificial weighting of the relative intensities of m/z values caused by the order of their observation. This effect occurs in scanning mass spectrometers because of the need to scan across the mass spectrum during a concentration-dependent transient signal such as a chromatographic peak.

Most detectors that offer spatial resolution are likely to be of limited physical dimensions, restricting the width of the m/z-window that can be collected at any time by DOFMS. Currently, different m/z-windows are investigated sequentially by changing extraction-field conditions and the delay time between constant-momentum extraction and DOFMS extraction. Under computer control this change can be accomplished very rapidly, and the images combined afterwards into a composite DOFMS spectrum.

Regardless of the type of mass analyzer used, it must also be capable of efficient ion transfer from the ionization region to the mass analyzer, efficient transmission of ions through the mass analyzer, and have the ability to handle relatively high ion fluxes for the most abundant components. The sector analyzer is an example of one that operates with a continuous beam of ions through the analyzer. The DOF analyzer is an example of one that operates on successive batches of ions. In either case, the operation of the array detector is the same. Each detector will integrate the signal coming to it over the specified integration time.

It will be understood that there is a trade-off between the detection limit and the integration time. Specifically, longer integration times detect more ions and therefore have a lower detection limit. Thus, while previous instruments have claimed to be able to increase their dynamic range to greater than 3 orders of magnitude, they do so by increasing the integration times, resulting in a lower detection limit. However in the presently described methods, the rate the sample comes through the instruments is determined by the rate of the chromatographic separations, resulting in the need to use an inalterable constant or uniform sample frequency (i.e. integration time).

Furthermore, there is another trade-off between the integration time and resolution on the chromatographic time axis. Shorter integration times (more frequent sampling) increases chromatographic resolution when combined with deconvolution of the individual ion channels. The high-throughput approach of the currently described methodology improves both these trade-offs by increasing dynamic range without increasing the integration time.

As stated above, in various embodiments of the invention, an adjustable-gain array detector is used. The reasons for using an adjustable-gain array detector over a single detector have to do with the advantages of having separate detectors for each m/z channel of information. In all commonly used forms of mass spectrometry, there is a single detector (or a small set of detectors operating in parallel) following the mass analyzer. This single detector detects different m/z values at different times. Manufacturers offer large numbers for the dynamic range of detection available for ion detection, but this is generally achieved by varying the time over which the single detector is sensing each specific mass ion. This time is called the integration time. This mode of operation relates then to specific parts of the spectrum or to specific response ranges, not to the whole spectrum or to a wide range of responses. When operating as a chromatographic detector, the mass spectrometer must operate at a fixed spectrum generation rate so that data are collected regularly across chromatographic time. This fixed spectral generation rate translates into a fixed integration time and thus a fixed response range over which the detector can operate.

A suitable array detector is the focal plane camera (FPC) or another detector having similar qualities. FPCs are described, for example in Barnes, Schilling et al. 2004; Barnes, Schilling et al. 2004; Barnes, Schilling et al. 2004; Barnes, Schilling et al. 2004; Koppenaal, Barinaga et al. 2005; Schilling, Andrade et al. 2006; Schilling, Andrade et al. 2007; Schilling, Ray et al. 2009, each of which is incorporated by reference. See also, U.S. Pat. No. 7,498,585, and US Patent Application Serial No. 2009/0121151, which are also hereby incorporated by reference. In general, FPCs are charge detectors based on micro Faraday strips and integrated-circuit electronics. They are capable of detection levels of just a few fundamental charges, but have an individually settable sensitivity giving them a dynamic range of up to 8 orders of magnitude (Schilling, Andrade et al. 2007; Schilling, Ray et al. 2009). In practice, the dynamic range could be somewhat less due to the background ion noise at each detector. Because of their initial application on a magnetic sector instrument, they have been called the focal plane camera (FPC).

Figure 7:
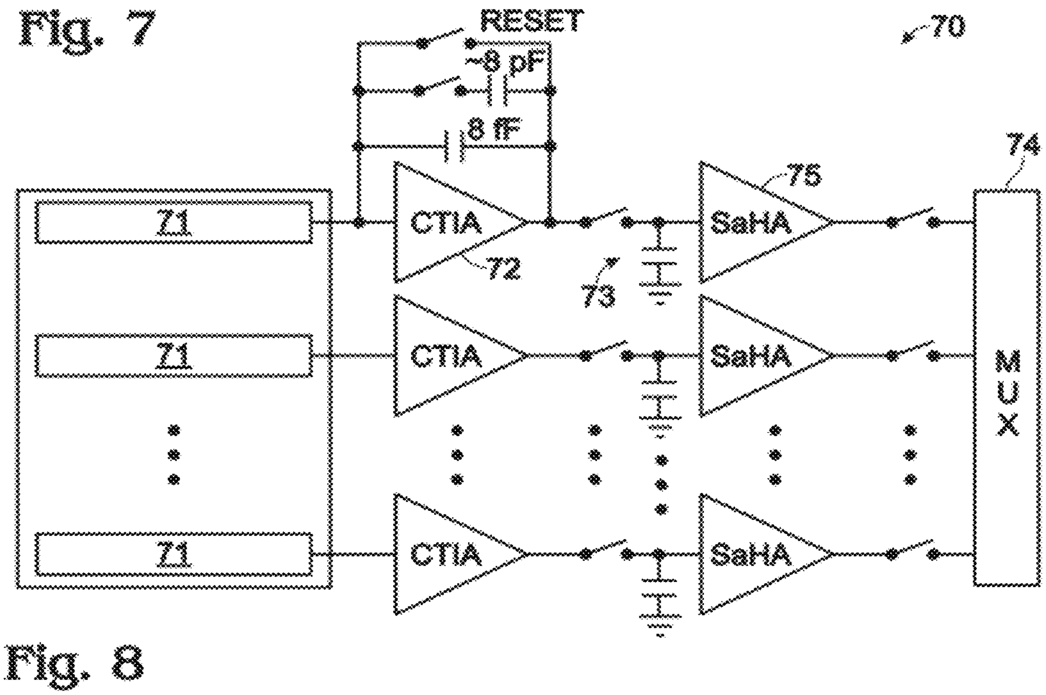
FIG. 7 is a schematic of a Focal Plane Camera (FPC). Each Faraday strip is connected to a dedicated capacitive transimpedance amplifier (CTIA) and sample-and-hold amplifier (SaHA) and read out by a multiplexer and computer.

A schematic diagram of an exemplary FPC is depicted in FIG. 7. The camera 70 employs 1696 individual charge collection electrodes 71 (termed Faraday strips), each measuring 8.5 μm wide×6.5 mm long and placed on 12.5 μm centers. Each Faraday strip is connected to a dedicated high-gain capacitive transimpedance amplifier (CTIA) 72, which possesses two switchable capacitors in a feedback loop. The capacitance value determines the gain of each Faraday strip-CTIA pair; for example, an 8.5 fF capacitance produces an output of 20 μv for each singly charged ion that strikes a Faraday strip. A second, larger capacitor 73 can be inserted into the feedback loop electronically, to drop the amplifier gain by a factor of 1000, thereby extending the dynamic range on a channel-by-channel basis. As ions strike each Faraday strip, charge is integrated by the individual CTIAs and read out by a multiplexer circuit 74 and a computer (not shown) to record the entire spatial profile (mass spectrum). A sample-and-hold amplifier (SaHA) 75 can also be switched into the readout circuit, to ensure that every Faraday strip is observed at the same instant and reduces read-error by permitting multiple measurements of the output of each Faraday strip. Because this mode of readout is non-destructive, each channel can be queried whenever desired, and in any order. Channels receiving a low ion flux can therefore be read many times to reduce reading noise, which is dominant in this sort of device. In contrast, channels that receive strong ion signals can be read and reset by means of a computer-controlled switch, to prevent over-ranging and increasing dynamic range.

Figure 8:
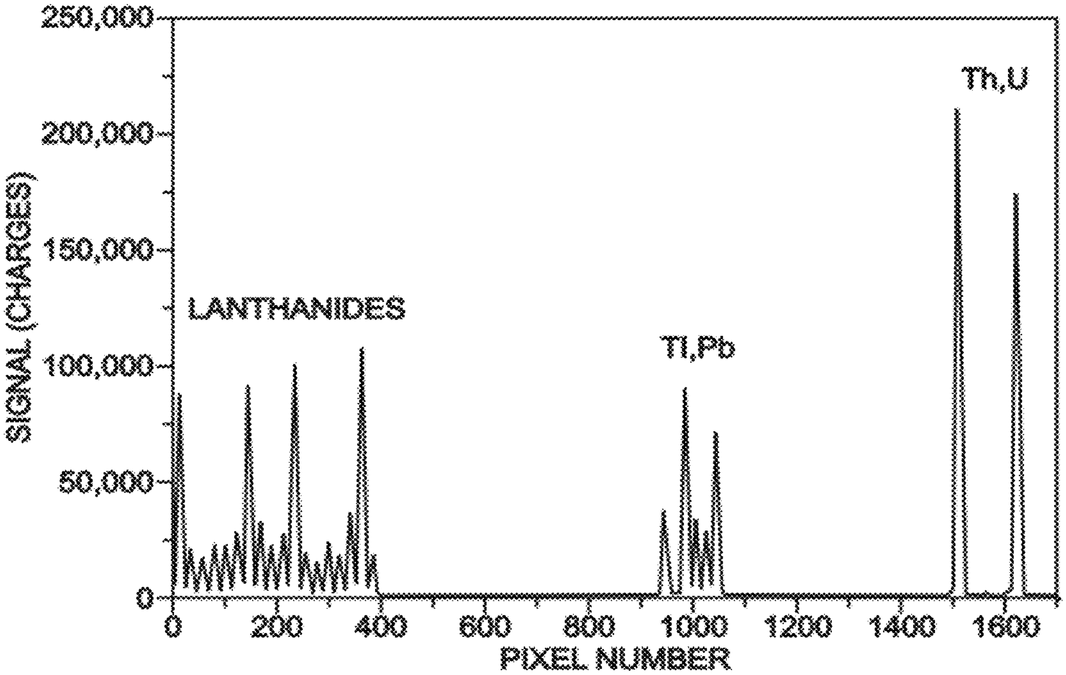
FIG. 8 depicts the mass spectra obtained with the FPC when used in an ICP-MS instrument. Multielemental solution concentration 10 ng/mL, 1 sec integration.

An example of a mass spectrum obtained when the FPC-MHMS was coupled to an inductively coupled plasma (ICP) ionization source is shown in FIG. 8. A multielemental solution containing elements present at 10 ng/mL was analyzed, and the mass range from 159 amu to 240 amu distributed across the face of the FPC and integrated simultaneously over 1.7 seconds. The pixel density provides 10-12 integration points across each peak with a 100 μm wide entrance slit, ensuring that each peak is well defined. This S/N level translates into detection limits that are typically <1 pg/mL, and which are comparable to those achieved with a conventional single-channel ion detector. Thus, the FPC is able to provide full mass spectral coverage without any performance loss compared to single-channel systems.

This advanced detector possesses several capabilities that make it well suited for use in the DOFMS. First, the FPC is a charge detection device that provides a response that is directly proportional to the ion charge. Thus, multiply charged ions such as those produced by ESI enjoy an inherent S/N gain. More importantly, the molecular mass of an ion does not adversely affect detector response (i.e. there is no mass bias). This is a significant advantage over other MS detectors (such MCPs), which exhibit significant signal loss from ions of high m/z. Second, the FPC detector is designed to combine high gain and broad linear dynamic range with rapid spectral readout. The current FPC routinely achieves a detection limit of <100 fundamental charges for each Faraday strip, with a 1 second integration. It has also demonstrated a linear dynamic range greater than 8 orders of magnitude for each Faraday strip in ICP-MS experiments. Importantly, nonlinearity in the working curve at the highest concentrations is due to the mass spectrograph and not the detector, so the available FPC dynamic range really extends beyond this value. While charge integration can be of almost unlimited duration, the minimum readout time for the entire 1696 channel FPC is currently 25 mSec. The capability to produce 40 spectra per second is certainly sufficient for chromatographic separations; moreover, the current obstacle to even greater speed is the computer data transfer rate, which could be addressed by improved computing performance. In these three areas, the FPC is able to achieve performance comparable to advanced MS detectors while also providing the spatial resolution required by the DOFMS technique.

The FPC also provides capabilities that are important to the success of the DOFMS instrument but not available in other systems. For example, each Faraday strip can be addressed individually and programmed to best suit the ion flux at a particular location. Further, each strip can be read nondestructively an arbitrary number of times, permitting real-time observation of charge accumulation or very precise measurement of the charge on a particular Faraday strip (reduction of read-noise). These capabilities will permit the FPC to be programmed on-the-fly to best respond to the changing conditions of a chromatographic separation. The FPC also has a form factor well suited to the DOFMS application and provides excellent spatial resolution. Since the FPC is fabricated on a single monolithic semiconductor chip, it should also be amenable to efficient upscaling, should it be required in future applications.

The detector may be constructed with an array of charge detectors or other ion detecting device. Each detector and its associated electronics will accumulate the ionic charge or detector response at its own rate. An interrogation or sensing of the accumulated response part way into the integration period would indicate the sensitivity setting that should be used for the rest of the integration period. During readout, the channel response plus its relative sensitivity would be used in constructing the mass spectrum. Alternatively, a detection system that has a logarithmic response to the accumulated ion signal may be devised. Such an array detector system with a physically dispersing mass analyzer will clearly extend the concentration range of detection by several orders of magnitude, depending on the system noise and total available ion flux. Because of the multiple detectors, higher-level components will swamp low-intensity signals only if they have exactly the same fractional mass and thus impinge on the same detector(s). Where suspected, this problem too could be addressed by switching to very high resolution over a limited mass range to resolve overlapping unit masses into their different exact masses. In chromatographic detection mode, all elements in the array will have the same integration time and this time will be constant throughout a given chromatographic run.

The readings from each detector will be digitized and stored as a function of chromatographic time. From these data, it is a simple task to construct a chromatogram for each detector element. Data in such a form are currently known as ion or mass chromatograms. From these ion chromatograms, computer algorithms will produce the peak area and retention time for each identified component. It is understood that the exact nature of these algorithms will depend on whether the ion source is fragmenting as in electron impact or prior ion fragmentation step, or non-fragmenting (soft) and also whether the spectrum will contain multiply-charged ions or not.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

REFERENCES

Abbassi, B. E., H. Mestdagh, et al. (1995). "Automatic extraction of relevant peaks and reconstruction of mass spectra for low signal-to-noise GC-MS data." Int. J. Mass Spectrom. Ion Processes 141(2): 171-186.
Aberg, K. M., R. J. O. Torgrip, et al. (2008). "Feature detection and alignment of hyphenated chromatographic-mass spectrometric data Extraction of pure ion chromatograms using Kalman tracking." J. Chromatogr., A 1192(1): 139-146.
Barnes, J. H., G. D. Schilling, et al. (2004). "Characterization of a Focal Plane Camera Fitted to a Mattauch-Herzog Geometry Mass Spectrograph. 2. Use with an Inductively Coupled Plasma." Anal. Chem. 76(9): 2531-2536.
Barnes, J. H. I. V., G. D. Schilling, et al. (2004). "Use of a novel array detector for the direct analysis of solid samples by laser ablation inductively coupled plasma sector-field mass spectrometry." J. Am. Soc. Mass Spectrom. 15(6): 769-776.
Barnes, J. H. I. V., G. D. Schilling, et al. (2004). "Coupling of a gas chromatograph to a simultaneous-detection inductively coupled plasma mass spectrograph for speciation of organohalide and organometallic compounds." J. Anal. At. Spectrom. 19(6): 751-756.
Barnes, J. H. I. V., G. D. Schilling, et al. (2004). "Simultaneous multichannel mass-specific detection for high-performance liquid chromatography using an array detector sector-field mass spectrometer." Anal. Bioanal. Chem. 380 (2): 227-234.
Biller, J. E. and K. Biemann (1974). "Reconstructed mass spectra, a novel approach for the utilization of gas chromatography-mass spectrometer data." Anal. Lett. 7(7): 515-528.
Davis, J. M. (1994). "Statistical Theory of Overlap for Variable Poisson Density: Relaxation of Constraint of Randomness." Anal. Chem. 66(5): 735-746.
Davis, J. M. (1997). "Extension of Statistical Overlap Theory to Poorly Resolved Separations." Anal. Chem. 69(18): 3796-3805.
Davis, J. M. (1997). "Study of isocratic separations by extended statistical theories of overlap." J. Microcolumn Sep. 9(3): 193-203.
Davis, J. M. (1999). "Prediction of numbers of singlets, doublets, and triplets in poorly resolved separations by statistical-overlap theory." J. Chromatogr., A 831(1): 37-49.
Dondi, F., A. Bassi, et al. (1998). "A Quantitative Theory of the Statistical Degree of Peak Overlapping in Chromatography." Anal. Chem. 70(4): 766-773.
El Fallah, M. Z. and M. Martin (1987). "Influence of the peak height distribution on separation performances: discrimination factor and effective peak capacity." Chromatographia 24: 115-122.
Enke, C. G. (1998). "The unique capabilities of time-of-flight mass analyzers." Adv. Mass Spectrom. 14: Chapter 9/197-Chapter 199/219.
F. Dondi, M. C. P., A. Felinger (1997). "Decoding Complex Multicomponent Chromatograoms by Fourier Analysis." Chromatographia 45: 435-440.
Felinger, A. (1998). Data Analysis and Signal Processing in Chromatography. Amsterdam, Elsevier.
Felinger, A., L. Pasti, et al. (1990). "Fourier analysis of multicomponent chromatograms. Theory and models." Anal. Chem. 62(17): 1846-1853.
Felinger, A., L. Pasti, et al. (1991). "Fourier analysis of multicomponent chromatograms. Theory of nonconstant peak width models." Anal. Chem. 63(22): 2627-2633.
Felinger, A., E. Vigh, et al. (1999). "Statistical determination of the proper sample size in multicomponent separations." J. Chromatogr., A 839(1+2): 129-139.
Fellinger, A. and M. C. Pietrogrande (2001). "Decoding complex multicomponent chromatograms." Anal. Chem. 73(21): 618A-626A.
Fraga, C. G. (2003). "Chemometric approach for the resolution and quantification of unresolved peaks in gas chromatography-selected-ion mass spectrometry data." J. Chromatogr., A 1019(1-2): 31-42.
Fredriksson, M., P. Petersson, et al. (2007). "An objective comparison of pre-processing methods for enhancement of liquid chromatography-mass spectrometry data." J. Chromatogr., A 1172(2): 135-150.
Govorukhina, N. I., T. H. Reijmers, et al. (2006). "Analysis of human serum by liquid chromatography-mass spectrometry: Improved sample preparation and data analysis." J. Chromatogr., A 1120(1-2): 142-150.
Holland, J. F., R. D. McLane, et al. (1992). Time-Compressed Chomatography in Mass Spectrometry. U. P. Office.
Imasaka, T., N. Nakamura, et al. (2009). "Data processing technique in gas chromatography/time-of-flight mass spectrometry." Analyst (Cambridge, U. K.) 134(4): 712-718.
Koppenaal, D. W., C. J. Barinaga, et al. (2005). "MS detectors." Anal. Chem. 77(21): 418A-427A.
LECO Corportation, S. J., MI.
Myers, D. P., G. Q. Li, et al. (1995). "An Inductively-Coupled Plasma—Time-of-Flight Mass Spectrometer (ICP-TOFMS) for Elemental Analysis. Part 2: DC Quadrupole Lens System for Improved Performance." J. Am. Soc. Mass Spectrom. 6(5): 400-410.
Nagels, L. J., W. L. Creten, et al. (1983). "Determination limits and distribution function of ultraviolet absorbing substances in liquid chromatographic analysis of plant extracts." Anal. Chem. 55(2): 216-220.
Sato, M. and T. Mitsui (1994). "Comparison between multivariate analysis and the conventional method for quantitative calculation using a gas chromatograph/mass spectrometer." Anal. Sci. 10(3): 485-490.
Schilling, G. D., F. J. Andrade, et al. (2006). "Characterization of a Second-Generation Focal-Plane Camera Coupled to an Inductively Coupled Plasma Mattauch-Herzog Geometry Mass Spectrograph." Anal. Chem. 78(13): 4319-4325.

Schilling, G. D., F. J. Andrade, et al. (2007). "Continuous Simultaneous Detection in Mass Spectrometry." Anal. Chem. (Washington, D.C., U.S.) 79(20): 7662-7668.

Schilling, G. D., S. J. Ray, et al. (2009). "Evaluation of a 512-Channel Faraday-Strip Array Detector Coupled to an Inductively Coupled Plasma Mattauch-Herzog Mass Spectrograph." Anal. Chem. (Washington, D.C., U.S.) 81(13): 5467-5473.

van Deursen, M. M., J. Beens, et al. (2000). "Evaluation of time-of-flight mass spectrometric detection for fast gas chromatography." J. Chromatogr., A 878(2): 205-213.

Veriotti, T. and R. Sacks (2001). "High-speed GC and GC/time-of-flight MS of lemon and lime oil samples." Anal. Chem. 73(18): 4395-4402.

Windig, W., J. M. Phalp, et al. (1996). "A Noise and Background Reduction Method for Component Detection in Liquid Chromatography/Mass Spectrometry." Anal. Chem. 68(20): 3602-3606.

Windig, W. and W. F. Smith (2007). "Chemometric analysis of complex hyphenated data." J. Chromatogr., A 1158(1-2): 251-257.

Wolff, M. M. and W. E. Stephens (1953). "Pulsed mass spectrometer with time dispersion." Rev. Sci. Instrum. 24: 616-617.

What is claimed is:

1. A method comprising;

subjecting a sample of interest to time-dependent separation;

ionizing the separated sample;

dispersing ions across an array of detectors according to the ions' m/z values; wherein each of the detectors in the array has a dynamically adjustable gain or a logarithmic (or other non-linear) response function; and detecting a ratio of responses having 4 or more orders of magnitude while operating with a constant integration time.

2. The method of claim 1 wherein the time-dependent separation is performed by a chromatograph.

3. The method of claim 2 further comprising collecting data from the array of detectors and analyzing the data with computer algorithms to produce chromatograph peak profiles for each detector element.

4. The method of claim 3 further comprising converting the peak profiles into indications of component detection.

5. The method of claim 1 wherein the time-dependent separation is performed by capillary electrophoresis.

6. The method of claim 1 wherein the time-dependent separation is performed by ion-mobility spectrometry.

7. The method of claim 1 further comprising detecting responses from at least 99% of the detectable components in the sample.

8. The method of claim 1 wherein the sample is a complex natural sample.

9. An instrument comprising:

a chromatographic device configured to separate a sample of interest;

a mass analyzer configured to ionize the separated sample and send ions of various m/z values along physically disparate paths; and an array of detectors wherein each of the detectors in the array has a dynamically adjustable gain or logarithmic response function;

wherein the instrument is capable of detecting a response ratio of 4 or more orders of magnitude while operating under constant integration time conditions; and wherein the instrument detects responses from at least 99% of the detectable components in the sample.

10. The instrument of claim 9 wherein the mass analyzer is a distance of flight mass spectrometer.

11. The instrument of claim 9 wherein the mass analyzer is a magnetic sector mass analyzer.

12. The instrument of claim 9 wherein the sample is a complex natural sample.

13. An instrument comprising:

a mass analyzer configured to ionize a separated sample and send ions of various m/z values along physically disparate paths; and an array of detectors wherein each of the detectors in the array has a dynamically adjustable gain or logarithmic response function;

wherein the instrument is capable of detecting a response ratio of 4 or more orders of magnitude while operating under constant integration time conditions; and wherein the instrument detects responses from at least 99% of the detectable components in the sample.

14. The instrument of claim 13 wherein the mass analyzer is a distance of flight mass spectrometer.

15. The instrument of claim 13 wherein the mass analyzer is a magnetic sector mass analyzer.

16. The instrument of claim 13 wherein the sample is a complex natural sample.

* * * * *